Patented May 1, 1928.

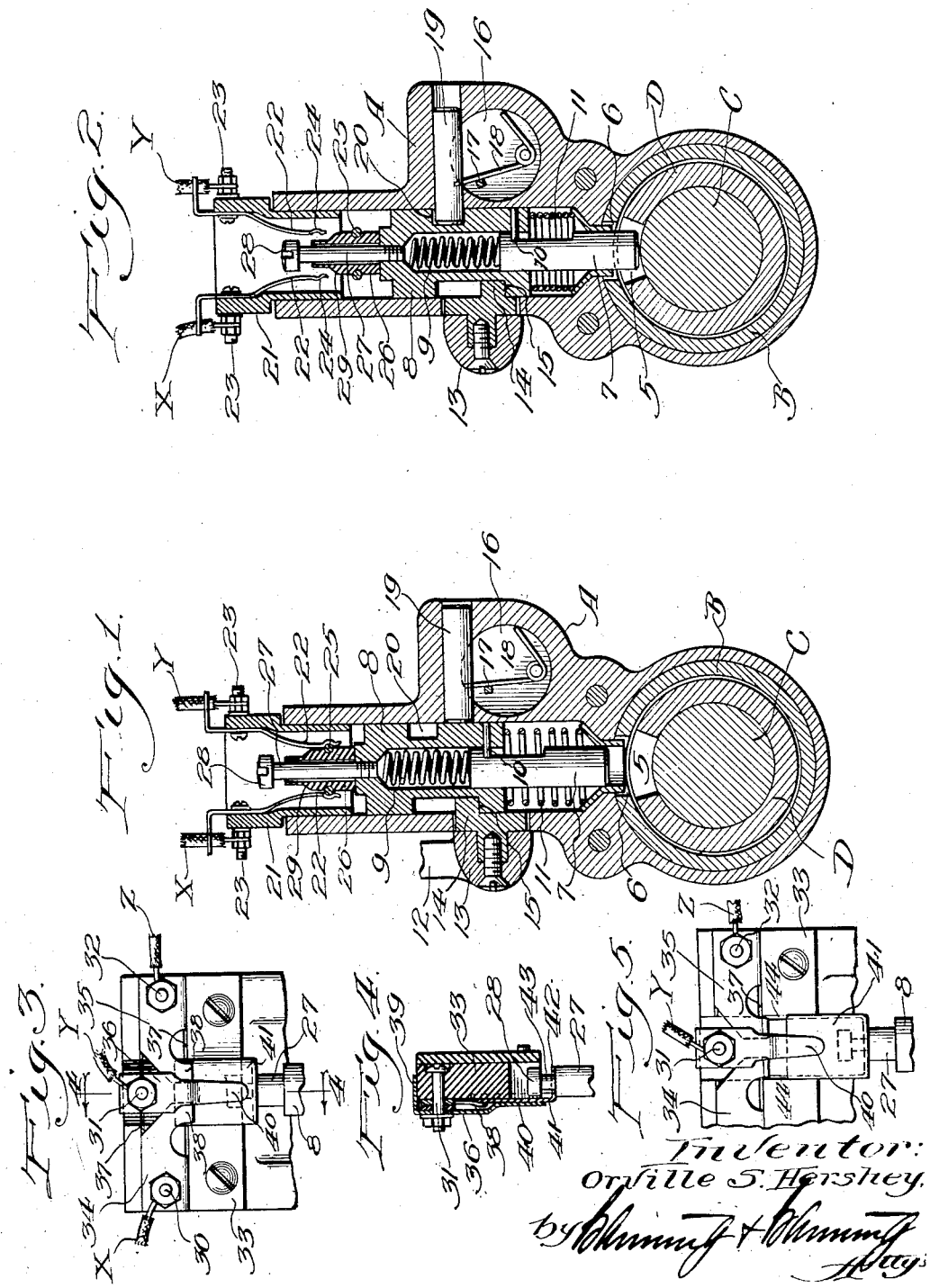

1,668,147

UNITED STATES PATENT OFFICE.

ORVILLE S. HERSHEY, OF CHICAGO, ILLINOIS, ASSIGNOR TO HERSHEY MANUFACTURING COMPANY, OF CHICAGO, ILLINOIS, A CORPORATION OF COLORADO.

AUTOMOBILE LOCK.

Application filed January 21, 1926. Serial No. 82,867.

This invention relates to a lock adapted especially for automobiles, and is designed more particularly for association with one of the operating units thereof. It may be connected with a steering mechanism, a change speed mechanism, a motor ignition circuit, or any other unit or system whose operation is required in the use of the vehicle.

The embodiment of my invention herein shown and described includes a switch which may be interposed in the motor ignition circuit. Such a switch is designed to be opened, thereby rendering the motor inoperative, whenever the lock is operated to interfere with use of the associated mechanism.

The present invention embodies certain improved features in the operative connection between the lock and switch by which movement of the latter is delayed until the former has reached an effective position from which it may not be displaced except by the use of a proper key. By this means the steering is disabled coincidentally with breaking of the associated electrical circuit. Also in the restoration of the parts to their normal operative condition, the closing of this circuit is deferred until the associated lock is fully released from its interfering position. My invention is accordingly concerned with a combined lock and switch having the characteristics noted, and with various other objects and purposes which will hereinafter appear.

In the drawing—

Figure 1 is a sectional view through a steering column and associated lock, showing the locking bolt as retracted;

Fig. 2 is a similar view, with the locking bolt advanced into interfering position relative to the steering post;

Fig. 3 is a view in elevation of a switch, adaptable to a three wire system, and operable by a lock mechanism such, for example, as is shown in Figs. 1 and 2;

Fig. 4 is a detail in section taken on line 4—4 of Fig. 3; and

Fig. 5 which is a view similar to Fig. 3 shows the switch in open position.

The present lock may be contained within a housing A through which is an opening for accommodating the column B within which is extended a post C connecting a steering wheel with the swiveled running wheels, usually at the front of an automobile. Secured fast to the post is a collar D having therein a groove or socket 5 which may be brought into register with an opening 6 formed in the column. The locking mechanism herein shown includes a bolt 7 adapted to be projected through the opening 6 into the socket 5 so as to lock the steering post against rotation. This bolt is associated yieldingly with a hollow plunger 8 wherein is accommodated a coiled spring 9 which tends to project the bolt into locking position. The forward movement of this bolt, relative to the plunger, may be arrested by a stop 10. A second spring 11 exerts an opposite force on the plunger such as to retract the same whenever conditions will permit.

Associated with the plunger is a control means for the locking bolt. As shown, this comprises a lever or handle 12 which is extended laterally from a hub 13 having a suitable rotatable mounting upon the lock housing. Extended inwardly from the hub is an eccentric 14 adapted to engage with a shoulder 15 near one end of the plunger. By moving the handle 12 to shift the position of the eccentric relative to its axis of movement, the plunger may be advanced against the tension of the spring 11, so as to project the locking bolt 7 toward the steering post whereby to disable the same against movement, when the bolt end is entered within the socket 5.

Retraction of the locking bolt from its advanced position is controlled by a cylinder lock 16 operable by a movable key, not shown. At the rear end of the cylinder is an eccentric lug 17 co-operating with a wire spring 18 which has connection with a detent in the form of a pin 19 slidably mounted in a transverse bore which intersects the passage wherein the plunger 8 is mounted. The inner end of this pin is adapted to be received within a groove or socket 20 formed in the plunger when the same has been moved inwardly to the position of Fig. 2. With the parts thus related the locking bolt is held in an inward or advanced position from which it may not be retracted without first rotating the lock cylinder so as to release the pin 19 from engagement with the plunger. Immediately following the withdrawal of this pin, the plunger and bolt are free to spring back to their normal or retracted positions, as shown in Fig. 1.

With any suitable lock structure, such, for example, as I have just described, may be associated an approved switch adapted to open or close the electrical circuit in which it is interposed. Two suggestive types of switches are herein shown by way of exemplifications.

Referring now to Figs. 1 and 2, an insulating bushing 21 is fitted to the lock housing, preferably in axial alignment with the plunger and locking bolt therein. Extending within the bushing are a pair of spring brushes 22, each alike, but disposed oppositely, as shown. Electrical conductors X and Y connect with the two brushes as through the medium of bolts 23 which pass through the bushing wall to engage singly with the brushes whereby they are held fixedly in place. The inner end of each brush may be curved to extend toward the other, and preferably is crimped as at 24 so as to frictionally engage, after the manner of a detent, with a conductor ring 25 which surrounds a second bushing 26 mounted on the end of the plunger 8. Through this latter bushing is extended a stem 27 adjustably connected to the plunger, a stem head 28 being so related to the proximate end of the bushing 26 as to permit this latter part to slide longitudinally thereupon for a desired distance. The outer end of this bushing may be tapered off, as at 29, for a purpose which will presently appear.

In operation, the handle 12 is manipulated to advance the plunger and locking bolt toward the steering post. Until this movement is completed, the pin 19 is unable to advance into the groove 20 to prevent a return of the parts to their initial position. With advancement of the locking bolt to effective position, however, the pin is snapped into the socket 20 whereby the parts are maintained indefinitely in this new relationship. With commencement of the plunger movement, the stem 27 is also moved, but without initially affecting the position of the bushing 26. The stem movement continues until its head 28 abuts the proximate end of the bushing 26, following which this latter part is also moved to effect a displacement of the conductor ring from between the two brushes. The contact between the conductor ring and its associated brushes is broken approximately at the moment the pin 19 advances to hold the locking bolt in its forward position. The brushes continue to press, however, upon the outer tapered end of the bushing in such manner as to impart thereto a moving force which pushes it toward the plunger from which it has been temporarily separated. The parts accordingly take up the position shown in Fig. 2 wherein the steering post is disabled, and the switch is opened to break the associated electrical circuit, the spring elements in the switch serving also to prevent accidental closing of the circuit.

The movement relation of the switch to the lock involves a lag on the part of the switch sufficient to permit the locking bolt to reach its intended position. A similar delayed operation on the part of the switch also attends the reverse movements of the locking bolt and plunger. This is due to the conductor ring remaining spaced from the two brushes a distance substantially equal to the return stroke of the locking bolt, whereby an electrical circuit through the switch is reestablished only when the bolt has been withdrawn clear of the steering post.

The switch just described is such as is applicable to one or two-wire electrical circuits. For a three-wire circuit, such as is also employed with ignition systems, it may be found advantageous to use a switch of the kind which I have shown in Figs. 3 and 4. As by means of a stem similar to that already described, it may be operatively connected to the locking bolt so as to derive its movements therefrom.

As shown, the switch of Figs. 3 and 4 is provided with terminal posts 30, 31 and 32 to which are connected conductor wires X, Y, and Z, respectively. These posts extend through an insulated block 33 and also through three contact plates 34, 35 and 36, which are fixedly mounted thereon. Two of these plates 34 and 35 are alike, and may be held against movement by bending certain of their edges to lie within grooves 37 formed in the face of the block. The third plate 36 has one end 39 bent laterally to rest upon one edge of the insulating block, its other end being formed to provide a spring tongue 40. This latter plate at no point touches either of the two plates 34 and 35. Its tongue is arranged, however, to preserve sliding contact with a movable plate 41 having one end 42 bent laterally and slotted to provide fingers which straddle a neck 43 adjacent the stem head 28. By this means the movable plate is shifted in response to reciprocations of the locking bolt, but only after advancement thereof a distance which is equal to the slip of the fingers along the stem neck 43. A delayed shift of the movable plate relative to that of the locking bolt is accordingly provided for.

In order that the movable plate may be properly guided, its side edges may be inwardly flanged so as to lie within grooves 44 which are formed in the face of the block. In all its moved positions, this plate remains in contact with the spring tongue 40 of the plate 36. In one position it underlies the tongues 38 of the two plates 34 and 35 so as to bridge the gap therebetween, thereby establishing a circuit between all three wires connected to the switch. In another position which is reached when the locking bolt is advanced to its forward position, this movable plate slides out from beneath the two tongues 38 so as to break the circuit between the wires X and Z. The timing of the switch movements in relation to those of the locking bolt may be precisely the same as that described for the construction of Figs. 1 and 2, due to the provision of similar connecting means for its operation.

In the use herein of the terms "open" and "closed" with reference to the motor ignition circuit, I have in mind the system of ignition most generally employed, but knowing that magneto equipped motors may be operated on an open circuit, which is the reverse of the prevailing kind, I would have these terms properly interpreted to describe the true situation. The various details of construction hereinbefore set forth are manifestly susceptible of embodiment in forms other than the precise ones shown, and any such modifications, in so far as they fall within the purview of the claims below, are to be considered as within the limits of my invention.

I claim:

1. In a lock, the combination with an operating member, of a bolt movable into engagement with said member to oppose operation thereof, a detent movable toward the bolt consequent upon its advance to hold the same against retraction, a switch for opening and closing an electric circuit having one component movable co-axially with the bolt, and a slip connection between the bolt and said switch component permitting free relative movement therebetween and adapted to impart to the latter a lag movement sufficient to produce a substantially coincidental operation of the detent and switch when the bolt is moved in one direction, substantially as described.

2. In a lock, the combination with an operating member, of a bolt movable into engagement with said member to oppose operation thereof, a switch having spring brushes located adjacent one bolt end, conductor means movable between the brushes for establishing a circuit therebetween, a mounting for said conductor means having an inclined surface against which the brushes may press to oppose movement thereof in one direction and speed movements thereof in the opposite direction, and a slip connection between said mounting and the bolt whereby movements of the former follow those of the latter, substantially as described.

3. In a lock, the combination with an operating member, of a bolt movable into engagement with said member to oppose operation thereof, and a switch in connection with a three-wire circuit having a single moving component in slip connection with the bolt, said component maintaining contact in all positions with the circuit of one wire, and in one position with all three wires, substantially as described.

4. In a lock, the combination with an operating member, of a bolt movable into engagement with said member to oppose operation thereof, a switch in connection with a three-wire circuit having a moving component in slip connection with the bolt, means in connection with the wires of two of the circuits adapted to be engaged by the moving component when in one position, and means connected with the wire in the remaining circuit adapted to engage the moving component in all positions thereof, substantially as described.

5. In a lock, the combination with an operating member, of a bolt movable into engagement with said member to oppose operation thereof, a switch in connection with a three-wire circuit having three terminals each of which connects to a plate, one of which overlies the others in spaced relation, and a plate connected for movement with the bolt and in constant contact with the overlying plate, said moving plate being adapted when in one position to engage also with the remaining plates whereby to connect up all three circuits, substantially as described.

6. In a lock, the combination with an operating member, of a bolt movable into engagement with said member to oppose operation thereof, means associated with the bolt forming a movable component of an electric switch, an insulated mounting whereon said component is guided in its movements, three plates secured to said mounting, each insulated from the others and one in constant contact with said movable component which, when moved to one position, engages with the other plates, substantially as described.

7. In a lock, the combination with a movable bolt of an associated electric switch having one of its components connected for movement with the bolt, and three contacts engageable by said component when in one position, one of said contacts being engaged thereby in all positions thereof, substantially as described.

ORVILLE S. HERSHEY.